United States Patent Office 3,141,839
Patented July 21, 1964

3,141,839
PRODUCTION OF KETOXIME HYDROCHLORIDES
Horst Metzger and Dieter Weiser, Ludwigshafen (Rhine), Germany, assignors to Badische Anilin- & Soda-Fabrik Aktiengesellschaft, Ludwigshafen (Rhine), Germany
No Drawing. Filed Jan. 22, 1962, Ser. No. 167,916
Claims priority, application Germany Jan. 25, 1961
7 Claims. (Cl. 204—162)

This invention relates to improvements in methods for the production of ketoxime hydrochlorides from hydrocarbons and nitrosating agents under the influence of light.

It is known that liquid or crystalline hydrochlorides of aliphatic, araliphatic or cycloaliphatic ketoximes are obtained when the corresponding hydrocarbons are treated with nitrosating agents, for example with nitrosyl chloride or with nitrogen monoxide and chlorine, with or without the addition of hydrogen chloride, with the simultaneous action of active light, for example having a wave length of 200 m$\mu$ to 600 m$\mu$, at a temperature of $-30°$ to $+40°$ C. After this process has been operated for a prolonged period, the light-transmitting parts of the apparatus on the surface facing the reaction mixture or the lamps when using submerged lamps as the source of light become coated with a yellow brown colored coating which is solid or viscous depending on the nature of the oxime hydrochloride formed. Free passage of light is thereby disturbed and this in turn causes decrease in the reaction speed so that, especially when the process is being carried out continuously, the reaction has to be discontinued at relatively short intervals and the glass parts of the apparatus which transmit light or the lamps, as the case may be, have to be cleaned. Owing to the action of light and/or heat issuing from the lamps, the said coating becomes more and more discolored by partial decomposition and the transmission of light is disturbed to an increasing extent. Moreover the formation of the coating lessens the yield of oxime hydrochlorides, increases the consumption of light energy and unfavorably influences the purity of the oxime hydrochlorides obtained.

Although methods are already known according to which the formation of a coating is suppressed by certain additives, these methods are not satisfactory because the additives to be used entail fresh difficulties. For example, they are soluble in the oxime hydrochloride formed, in some casees even more readily than in the hydrocarbon, and are therefore continually removed from the reaction mixture with the oxime hydrochloride. Apart from the fact that these additives must then be continuously replaced, they contaminate the oxime hydrochloride formed to such an extent that troublesome purification thereof is necessary before it is processed, for example into lactams which are valuable as initial materials for polyamides.

It is an object of the present invention to provide a process for the photo-oximation of hydrocarbons in which coating of the lamp is prevented. Another object of the invention is to provide a process for carrying out the photo-oximation of hydrocarbons for a long period without interruption. A further object of the invention is to provide a process for preparing pure ketoxime hydrochloride in a continuous operation by photo-oximation. It is a further object of the invention to provide a process for the photo-oximation of hydrocarbons which can be carried out continuously without the continuous addition of extraneous substances.

These objects are achieved by carrying out the process for the production of saturated aliphatic, saturated cycloaliphatic and araliphatic ketoxime hydrochlorides by reaction of alkanes, cycloalkanes and arylalkanes in the liquid phase with nitrosating agents with simultaneous irradiation with light at a temperature of $-30°$ C. to $+40°$ C. in such a way that an uninterrupted coherent layer of a solid light permeable substance which is also present in the liquid phase is maintained in the boundary zone of the reaction mixture through which the light is transmitted.

Generally speaking the said layer is maintained by appropriate choice of the temperatures in the boundary zone and in the reaction zone. In the ideal case, there is equilibrium between the solid boundary layer and the liquid reaction mixture, i.e. the material exchange between the two phases is such that the number of molecules which passes into solution is the same as the number of molecules which at the same time separate from the solution onto the solid layer. In this case the thickness of the solid layer is constant. It is obvious that variations in the thickness of the layer may occur under the conditions of the process.

Aliphatic, araliphatic and cycloaliphatic hydrocarbons used for the known methods are suitable as initial materials for the process according to this invention, for example n-hexane, n-heptane, toluene, ethylbenzene, xylenes, cyclopentane, fluorene, cyclohexane, decahydronaphtalene, cycloheptane, cyclooctane and cyclododecane, and they may be dissolved in inert solvents, as for example aromatic hydrocarbons such as benzene, or chlorinated aliphatic or aromatic hydrocarbons such as carbon tetrachloride, chloroform or monochlorobenzene.

The said equilibrium between solid layer and liquid reaction mixture is set up for example by cooling the boundary zone. In this way the hydrocarbon and/or any inert solvent used separates in solid form as a boundary layer which is maintained by further cooling the boundary zone. Equilibrium may however also be achieved by applying the solid substance to the light transmitting surface and then allowing the reaction mixture to dissolve such an amount of the solid that saturation of the reaction mixture occurs and no further solid is dissolved.

It is essential that the substance forming the said layer be soluble in the reaction mixture which consequently contains dissolved molecules of the kind forming the layer. Layers consisting of substances insoluble in the reaction mixture are unsuitable and are as quickly contaminated with the above-mentioned yellow-brown coating as glass. The crystal layer may consist of the hydrocarbon to be oximated. Working in this way is especially advantageous when reacting cycloaliphatic hydrocarbons with six to twelve carbon atoms. When the freezing point is a few degrees Centigrade, for example 1 to 10° C., below the desired reaction temperature and the reaction is to be carried out without the coemployment of solvents, the hydrocarbon can be caused to freeze out on the light transmitting surface by appropriate cooling of the latter. The light transmitting surface may be cooled for example to a temperature which is 5 to 10° C. lower than the freezing point. If the hydrocarbon to be oximated is diluted in a solvent, the concentration of the hydrocarbon may be kept sufficiently high for a solid layer of hydrocarbon or hydrocarbon and solvent to separate on the light transmitting surface when the latter is cooled. If the concentration of the hydrocarbon to be oximated is not high enough or if the hydrocarbon does not freeze within the temperature range in question, it is possible in the case of a solvent having an appropriate freezing point to precipitate the solvent in solid form as a coherent layer on the light transmitting surface by cooling. Naturally it is also possible to apply the solid layer, by solidification from a melt or by sublimation, prior to the commencement of the process, and to maintain this layer during the reaction by cooling or maintaining the saturation concentration in the reaction mixture.

It is however also possible to use an auxiliary substance which is inert to the reactants and has little or no absorption in the active spectral range, for example a polynuclear aromatic hydrocarbon having an appropriately high melting point, such as naphthalene or anthracene, or a chlorinated hydrocarbon with two to six carbon atoms having an appropriately high melting point, such as hexachloroethane.

An auxiliary of this type may be used with advantage when the hydrocarbon to be oximated or the diluent does not solidify until it is at a temperature well below the desired reaction temperature, for example 5 to 10° C. below the same. The auxiliary substance may be applied in a way analogous to that described above when using the hydrocarbon to be oximated, i.e. by crystallization from a melt or from a solution or by sublimation, and it may be applied prior to the commencement of the reaction. The solid substance which forms the boundary layer between the reaction solution and the light transmitting surface is in equilibrium with the reaction solution.

If the layer of solid is maintained on the light transmitting surface by cooling, it is advantageous to use a temperature gradient between the boundary zone and the reaction mixture, for example by maintaining a temperature difference of 1 to 20° C. between the liquid reaction mixture and the light transmitting surface.

The thickness of the crystal layer to be used according to this invention may vary within wide limits; it should however be at least bimolecular. The only limit to the maximum thickness of the crystal layer is set by the need for a sufficient amount of liquid phase to be available for the reaction. For reasons of economy, however, the thickness of the layer will not be too great; it may be reduced by raising the temperature of the light transmitting parts or increased by lowering the said temperature. Layer thicknesses of 0.1 to 1.0 cm. have proved to be suitable.

The process is carried out in the manner conventional for the reaction of aliphatic, araliphatic and cycloaliphatic hydrocarbons with nitrosating agents, such as nitrosyl chloride, nitrogen monoxide and chlorine, or compounds which form nitrosyl chloride in the reaction medium, as for example alkyl nitrites and hydrogen chloride, nitrous gases and hydrogen chloride or nitrosylsulfuric acid and hydrogen chloride, under the usual conditions, for example at temperatures of −30° to +40° C. and if desired in the presence of hydrogen chloride. The speed of the reaction is not impaired by the presence of the crystal layer.

The invention is illustrated by, but not limited to, the following examples.

Example 1

The reaction vessel is a cylindrical vessel 20 cm. in height and 6.5 cm. in internal diameter which is provided at the bottom with a drain cock, in which is placed a glass cooling jacket vessel with an inlet and outlet, and in which in turn a submerged mercury lamp of 80 watts is placed. The cylindrical vessel is filled with 312 g. of cyclohexane and this is saturated at room temperature with hydrogen chloride. Coolant is then circulated through the cooling jacket and its temperature regulated so that the internal temperature of the reaction vessel is between 4° and 6° C. and the lamp cooling jacket is covered with a layer of solid cyclohexane 3 to 5 mm. in thickness. After the mercury lamp has been switched on, 2 g. portions of nitrosyl chloride are added at intervals of 35 minutes and at the same time hydrogen chloride is led in so that the solution is always saturated therewith.

The cyclohexanone oxime hydrochloride formed separates as a heavy oil which settles down to the bottom and is run off from time to time. Nine 2 g. portions of nitrosyl chloride are introduced in all. The time required to decolorise a 2 g. portion of nitrosyl chloride is 35 minutes in each case. There is no discoloration of the reaction solution by impurities.

The layer of crystal and also the glass of the lamp cooling vessel are completely free from coating after the reaction of the total of 18 g. of nitrosyl chloride introduced. The oily hydrochloride is dissolved in water and neutralised with caustic soda solution. 19.65 g. of cyclohexanone oxime is obtained with the melting point 89° C. Another 3.45 g. of oxime is obtained by extraction of the aqueous solution with ether. The total yield of oxime is thus 23.10 g. or 74% of the theory with reference to nitrosyl chloride used.

By working in the same way but without the crystal layer on the jacket vessel for the lamp, and at 12° to 14° C., the reaction period is considerably prolonged after the third 2 g. portion, as can be seen from the decolorization. When a total of 12 g. of nitrosyl chloride has been added, it is necessary to interrupt the experiment because the cooling jacket is coated by such a dense dark brown coating that active light can no longer penetrate it. The yield of contaminated cyclohexanone oxime having the melting point 85° C. is 13.5 g., i.e. 65% of the theory with reference to the nitrosyl chloride used.

Example 2

820 g. of cyclooctane is charged to a cylindrical stirring vessel 21 cm. in height and 9.5 cm. in internal diameter which, as in Example 1, is fitted with a drain cock, submerged mercury lamp and a cooling jacket vessel for the lamp. The cyclooctane is saturated with hydrogen chloride at room temperature and cooled by means of the lamp cooling jacket so that a crystal layer of cyclooctane 2 to 6 mm. in thickness forms on the cooling jacket and the internal temperature of the cyclooctane is 13° to 15° C. for the duration of the reaction. The mercury lamp is switched on, a stream of hydrogen chloride is led in while stirring so that the solution remains continually saturated therewith, and 18 g. of nitrosyl chloride is introduced in 2 g. portions, each 2 g. portion being added after complete reaction of the previous 2 g. portion which is recognizable from the decolorization of the solution. The same period of 40 minutes is required each time. The oily oxime hydrochloride separates at the bottom of the vessel and is run off periodically.

The crystal layer and also the cooling vessel are entirely free from coating after the whole of the 18 g. of nitrosyl chloride has been reacted. The cyclooctanone oxime hydrochloride is dissolved in water and neutralized with caustic soda solution and 35.8 g. of cyclohexanone oxime having the melting point 41° to 42° C. is obtained. This is 89% of the theory, with reference to the nitrosyl chloride used.

By working in the same way at a temperature of 16° to 18° C. but without a crystal layer on the cooling jacket of the lamp, the reaction period for a 2 g. portion of nitrosyl chloride is prolonged even from the second portion; double the reaction period is required for decolorization of the sixth portion as for the first portion so that only seven 2 g. portions are introduced. The part of the cooling jacket vessel through which the light is transmitted becomes coated in this case with a brown resin which is only partly soluble in water while cyclooctanone oxime hydrochloride has very good solubility in water. After a total of 14 g. of nitrosyl chloride has been added, the experiment is discontinued. The product is worked up as described above and 23.5 g. of cyclooctanone oxime having the melting point 39° C. is obtained. The yield is thus 77.8% of the theory with reference to nitrosyl chloride introduced.

Example 3

1265 g. of a 45% by weight solution of cyclododecane in carbon tetrachloride is saturated with hydrogen chloride at room temperature in the agitated vessel described in Example 2. The reaction mixture is then cooled in such a way that a layer about 5 to 7 mm. in thickness crystallizes on the surface through which light is transmitted and the reaction mixture has a temperature of 13° to 15° C. during the reaction. After the mercury lamp has been switched on, 2 g. portions of nitrosyl chloride are introduced at 40-minute intervals in the way described in the preceding examples and at the same time the solution is kept saturated with hydrogen chloride by leading the latter into the mixture. Prior to the second, third and each subsequent addition of 2 g. portions of nitrosyl chloride, 5 g. of cyclododecane is introduced into the reaction mixture in order that the degree of saturation, which is reduced by reaction with nitrosyl chloride, is constantly maintained and that the thickness of the crystal layer and the internal temperature remain unchanged for the duration of the reaction. Nine portions, i.e. 18 g. in all, of nitrosyl chloride are introduced. After the reaction there is no coating either on the crystal layer or on the light transmitting surface.

The crystalline cyclododecanone oxime hydrochloride formed is filtered by suction after a total reaction period of six hours, washed with carbon tetrachloride and dried in vacuo.

To determine the yield, the cyclododecane solution remaining after filtering the crystals off by suction is shaken up with dilute caustic soda solution to remove hydrogen chloride, the carbon tetrachloride distilled off and the cyclododecane distilled in vacuo. 572.3 g. of cyclododecane is obtained having the boiling point 115° C. at 14 mm. Hg and the melting point 61° C. The yield of cyclododecanone oxime hydrochloride having the melting point 129° C. is 47 g., i.e. 90% of the theory with reference to hydrocarbon reacted.

In an analogous reaction of a 35% by weight solution of cyclododecane in carbon tetrachloride at 16° to 18° C. but without a crystal layer on the jacket vessel of the lamp, the light transmitting surface becomes coated with a solid brown coating. 7½ hours are required for complete reaction of the nitrosyl chloride. By working up as above, only 43.8 g. of a brownish cyclododecanone oxime hydrochloride having the melting point 123° to 125° C. is obtained. Determination of the yield in the way described above gives a result of 85% of the theory with reference to hydrocarbon reacted.

*Example 4*

A cooling jacket vessel suitable for the apparatus described in Example 1 is provided with a crystal layer about 5 mm. in thickness by dipping it in fused naphthalene. The cooling jacket vessel thus prepared is installed in the cylindrical vessel 20 cm. in height and 6.5 cm. in internal diameter described in Example 1. 300 g. of a 10% by weight solution of naphthalene in decahydronaphthalene is charged to the vessel and at the same time cooling is effected so that the internal temperature of the solution is 6° to 9° C. This temperature is maintained constant during the reaction. The solution is saturated with hydrogen chloride and hydrogen chloride is also led in during the reaction in such an amount that the solution remains saturated therewith. After the lamp has been switched on, nitrosyl chloride is led in in 2 g. portions, as described in the previous examples, and at intervals of 45 minutes which are necessary for complete reaction detectable from the decolorization of the solution. The hydrochlorides of the isomeric oximinodecahydronaphthalenes separate in an oily form during the reaction at the bottom of the vessel and can be run off periodically.

After six 2 g. portions of nitrosyl chloride (12 g.) have been added and a total reaction period of 4½ hours, the reaction is discontinued. Both the crystal layer and the glass cooling jacket thereunder are entirely free from coating. The oxime hydrochloride is dissolved in water and the aqueous solution neutralized with caustic soda solution. The precipitate is extracted with ether and 24.3 g. of a mixture of isomers of the oximes of ketodecahydronaphthalenes is obtained as a pale brown partly crystalline mass. The yield is thus 79.5% of the theory with reference to nitrosyl chloride.

The crystal layer may also be applied by sublimation of the naphthalene. Instead of naphthalene, hexachloroethane may be used with the same good result. In the latter case the reaction may be carried out for example with a 10% by weight solution of hexachloroethane in decahydronaphthalene. It is also possible however to carry out the reaction of decahydronaphthalene with a crystal layer of decahydronaphthalene itself (analogously to Example 2) and it is then advantageous to maintain a reaction temperature of −26° to −28° C.

When 300 g. of decahydronaphthalene is reacted with a total of 12 g. of nitrosyl chloride at 17° to 18° C. without a crystal layer on the jacket vessel of the lamp, a marked prolongation of the reaction period up to decolorization of the solution takes place even for the second 2 g. portion. The sixth 2 g. portion of nitrosyl chloride has not completely reacted after a reaction period of 150 minutes, i.e. 3.3 times the reaction period of the first 2 g. portion. After a total of 12 g. of nitrosyl chloride has been added, the reaction is stopped; the reaction period is 7 hours. The cooling jacket vessel is covered with a thick resinous black-brown coating which is insoluble in water. The solution is dark brown in color; after some time the color becomes dark greenish, a clear indication that the reaction had not yet been completed. After the product has been worked up as described above, 15.1 g. of the isomeric oximes of ketodecahydronaphthalenes is obtained as an oily dark brown mass. The yield is 49% of the theory with reference to nitrosyl chloride.

When using a crystal layer of naphthalene to protect the lamp surface, an isomer mixture of n-heptanone oximes is obtained in an analogous way from n-heptane in a yield of 71%; no coating occurs on the lamp even after carrying out the process for ten hours.

We claim:

1. In a process for the production of hydrochlorides of ketoximes selected from the group consisting of aliphatic, cycloaliphatic and araliphatic ketoximes by reaction of hydrocarbons selected from the group consisting of alkanes, cycloalkanes and arylalkanes in the liquid phase with nitrosating agents in a reaction zone in the presence of active light at a temperature of −30° to +40° C., the improvement which comprises maintaining an uninterrupted coherent layer in the boundary zone of the reaction mixture on a light transmitting surface in contact with the reaction mixture through which the light is transmitted, the said layer consisting of a solid, light permeable and substantially colorless substance selected from the group consisting of said hydrocarbon reactant, benzene naphthalene, anthracene, and halogenated hydrocarbons having 2 to 6 carbon atoms, said substance also being present in the liquid phase and being soluble in said reaction mixture.

2. The improvement as claimed in claim 1 which comprises maintaining said solid layer in the boundary zone by cooling the boundary zone.

3. The improvement as claimed in claim 1 which comprises maintaining said solid layer in the boundary zone by saturating the reaction mixture with said solid substance.

4. The improvement as claimed in claim 1 wherein the reaction is carried out in the presence of hydrogen chloride.

5. In a process for the production of hydrochlorides of ketoximes selected from the group consisting of aliphatic, cycloaliphatic and araliphatic ketoximes by reaction of hydrocarbons selected from the group consisting of alkanes, cycloalkanes and arylalkanes in the liquid phase with nitrosating agents in a reaction zone in the presence of active light at a temperature of −30° to +40° C., the improvement which comprises maintaining on a light transmitting surface in contact with the reaction mixture through which the light is transmitted an uninterrupted coherent layer in solid form of the substantially colorless hydrocarbon to be oximated.

6. The improvement as claimed to claim 1, in which the uninterrupted coherent layer in the boundary zone is maintained by cooling the boundary zone to a temperature which is 5 to 10° C. lower than the freezing point of the hydrocarbon to be oximated.

7. The improvement as claimed in claim 1, in which the uninterrupted coherent layer in the boundary zone is maintained by a temperature gradient of 1 to 20° C. in the boundary zone.

References Cited in the file of this patent
UNITED STATES PATENTS

| | | |
|---|---|---|
| 2,879,215 | Reppe et al. | Mar. 24, 1959 |
| 2,985,572 | Von Schickh et al. | May 23, 1961 |

UNITED STATES PATENT OFFICE
CERTIFICATE OF CORRECTION

Patent No. 3,141,839                                              July 21, 1964

Horst Metzger et al.

It is hereby certified that error appears in the above numbered patent requiring correction and that the said Letters Patent should read as corrected below.

Column 6, line 55, after "benzene" insert a comma; column 7, line 6, for "to" read -- in --.

Signed and sealed this 17th day of November 1964.

(SEAL)
Attest:

ERNEST W. SWIDER                                      EDWARD J. BRENNER
Attesting Officer                                         Commissioner of Patents